United States Patent
Sofer et al.

(10) Patent No.: US 9,977,849 B2
(45) Date of Patent: *May 22, 2018

(54) METHOD AND APPARATUS FOR CALCULATING DELAY TIMING VALUES FOR AN INTEGRATED CIRCUIT DESIGN

(71) Applicants: Sergey Sofer, Rishon Lezion (IL); Asher Berkovitz, Kiryat Ono (IL); Michael Priel, Netanya (IL)

(72) Inventors: Sergey Sofer, Rishon Lezion (IL); Asher Berkovitz, Kiryat Ono (IL); Michael Priel, Netanya (IL)

(73) Assignee: NXP USA, Inc., Austin, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/759,232

(22) PCT Filed: Jan. 9, 2013

(86) PCT No.: PCT/IB2013/050177
§ 371 (c)(1),
(2) Date: Jul. 6, 2015

(87) PCT Pub. No.: WO2014/108739
PCT Pub. Date: Jul. 17, 2014

(65) Prior Publication Data
US 2015/0347653 A1    Dec. 3, 2015

(51) Int. Cl.
*G06F 17/50* (2006.01)

(52) U.S. Cl.
CPC ...... *G06F 17/5031* (2013.01); *G06F 17/5081* (2013.01); *G06F 2217/84* (2013.01)

(58) Field of Classification Search
CPC ............... G06F 17/5031; G06F 17/505; G06F 17/5081; G06F 2217/84; G01R 31/3016; G01R 31/31725
USPC .................................................. 716/108, 134
See application file for complete search history.

(56) References Cited

U.S. PATENT DOCUMENTS

| | | | |
|---|---|---|---|
| 2008/0116455 A1 | 5/2008 | Jain et al. | |
| 2009/0031268 A1* | 1/2009 | Miranda | G06F 17/5031 716/113 |
| 2009/0113358 A1 | 4/2009 | Goodnow et al. | |
| 2009/0160515 A1* | 6/2009 | Warnock | H03K 5/1565 327/175 |
| 2010/0214007 A1 | 8/2010 | Georgion | |
| 2012/0119825 A1 | 5/2012 | Zhai et al. | |

(Continued)

OTHER PUBLICATIONS

International Search Report and Written Opinion correlating to PCT/IB2013/050177 dated Oct. 16, 2013.

(Continued)

*Primary Examiner* — Paul Dinh

(57) ABSTRACT

A method and apparatus for calculating delay timing values for at least a part of an integrated circuit design. The method comprises applying a first Negative/Positive Bias Temperature Instability compensation margin to delay values for elements within the at least part of the IC design, identifying at least one lower-rate switching element within the at least part of the IC design, and applying at least one further, increased N/PBTI compensation margin to the delay value(s) for the at least one identified lower-rate switching element.

16 Claims, 2 Drawing Sheets

(56) References Cited

U.S. PATENT DOCUMENTS

2012/0159276 A1  6/2012  Zandian et al.
2012/0182079 A1  7/2012  Kim et al.

OTHER PUBLICATIONS

Sanjay V. Kumar, Chris H. Kim, Sachin S. Sapatnekar; "NBTI—Aware Synthesis of Digital Circuits"; Proceedings of the IEEE/ACM Design Automation Conference, Jun. 2007.
J. B. Yang, T. P. Chen, S. S. Tan and L. Chan; "A novel empirical model for NBTI recovery with the modulated measurement time frame"; Proceedings of 13th IPFA 2006, Singapore, p. 33, 2006.

\* cited by examiner

US 9,977,849 B2

METHOD AND APPARATUS FOR CALCULATING DELAY TIMING VALUES FOR AN INTEGRATED CIRCUIT DESIGN

FIELD OF THE INVENTION

This invention relates to a method and apparatus for calculating delay timing values for at least a part of an integrated circuit design.

BACKGROUND OF THE INVENTION

In the field of modern VLSI (Very Large Scale Integration) integrated circuit (IC) devices, Metal Oxide Semiconductor Field Effect Transistor (MOSFET) devices often have rarely switching periods such as during low power modes, or are simply rarely switching devices, for example within control logic etc. During such periods of non- (or infrequent) switching, a MOSFET device is subjected to a constant bias voltage, which can result in the PMOSFET or NMOSFET device experiencing respectively Negative Bias Temperature Instability (NBTI) or Positive Bias Temperature Instability (PBTI) stress. N/PBTI stress can cause key reliability issues in MOSFET devices, and manifests as an increase in the threshold voltage (Vth) and consequently a decrease in the drain current and transconductance of the MOSFET device, which results in performance degradation of the MOSFET device.

In order to compensate for such performance degradation of MOSFET devices caused by NBTI/PBTI stress, it is conventional to provide additional margins within the delay of signal paths throughout the IC device, for example up to 10%. However, a problem with this conventional approach is that it introduces extra costs in terms of additional area, power and design effort across the entire IC device, including for those parts of the IC device that do not suffer from significant NBTI/PBTI stress, and thus which do not require such generous additional margins.

SUMMARY OF THE INVENTION

The present invention provides a method of calculating delay timing values for at least a part of an integrated circuit (IC) design, a method of performing static timing analysis of at least a part of an IC design, an apparatus comprising at least one signal processing module arranged to calculate delay timing values for at least a part of an IC design, and a non-transitory computer program product having executable program code stored therein for calculating delay timing values for at least a part of an IC design as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
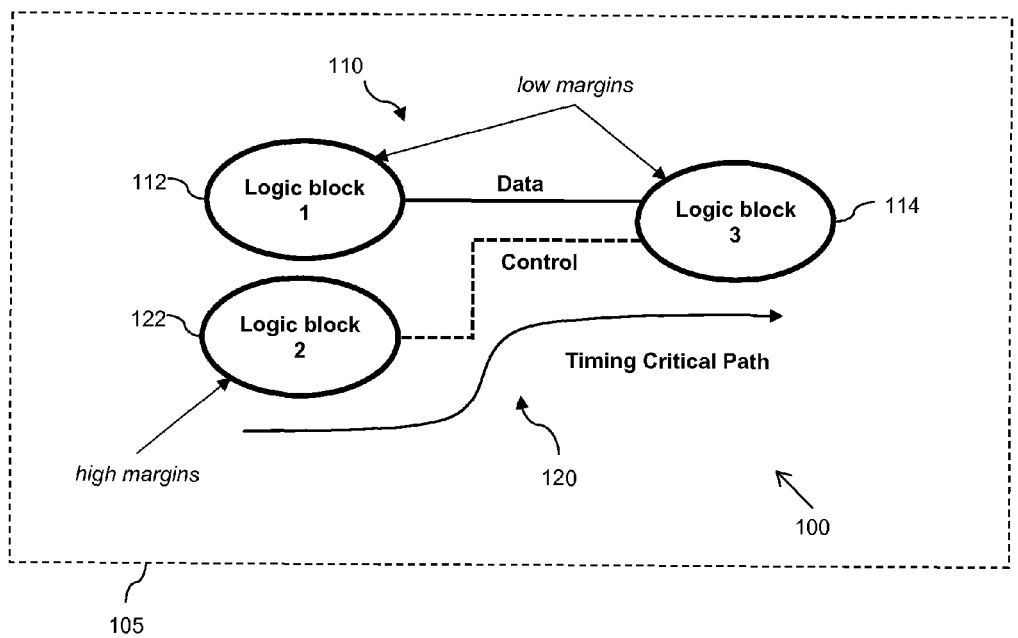
FIG. 1 illustrates a simplified example of a critical timing stage that may be implemented within an integrated circuit device.

The present invention will now be described with reference to the accompanying drawings in which examples of a method and apparatus for calculating delay timing values for at least a part of an integrated circuit (IC) design are described and illustrated. However, it will be appreciated that the present invention is not limited to the specific examples illustrated and described herein. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In accordance with some examples, there is provided a method and apparatus for calculating delay timing values for at least a part of an integrated circuit (IC) design. The method comprises applying a first Negative/Positive Bias Temperature Instability (N/PBTI) compensation margin to delay values for elements within the at least part of the IC design, identifying at least one lower-rate switching element within the at least part of the IC design, and applying at least one further, increased N/PBTI compensation margin to the delay value(s) for the at least one identified lower-rate switching element.

In this manner, the increased N/PBTI compensation margin(s) may be applied to delay values for lower-rate switching elements, which are typically prone to greater levels of performance degradation as a result of N/PBTI stress, whilst allowing the majority of elements within the IC design to have a lower (first) N/PBTI compensation margin applied thereto. As a result of a lower N/PBTI compensation margin being applied to the majority of elements, delay timing values for the IC device are not unnecessarily overestimated by applying a common (worst case scenario) N/PBTI compensation margin across the entire IC design. Thus, the design effort in achieving closure in timing paths may be reduced, and a reduction in the silicon area and power consumption of the IC design may also be achieved through eased timing constraints.

In some examples, the method may comprise identifying at least one lower-rate switching timing critical element within the at least part of the IC design, and applying the at least one further, increased N/PBTI compensation margin to the delay value(s) for the at least one identified lower-rate switching timing critical element.

In this manner, the increased N/PBTI compensation margin(s) may be applied to delay values for lower-rate switching timing critical elements which are not only prone to greater levels of performance degradation as a result of N/PBTI stress, but also sensitive to field failures caused by excessive delays, whilst allowing the non-timing critical elements and higher-rate switching timing critical elements within the IC design to have a lower (first) N/PBTI compensation margin applied thereto.

In some further examples, the method may comprise applying the first N/PBTI compensation margin to delay values for elements within the at least part of the IC design, calculating setup/hold timing values for timing paths within the at least part of the IC design based at least partly on delay values to which the first N/PBTI compensation margin has been applied, and identifying timing critical elements based at least partly on the calculated setup/hold timing values.

In some further examples, the method may comprise applying a test suite to the at least part of the IC design, monitoring switching activity of at least one element of the at least part of the IC design during running of the test suite, and identifying at least one lower-rate switching element based at least partly on the switching activity therefore.

In some further examples, the method may comprise identifying an element within the at least part of the IC design as comprising a lower-rate switching element if said element comprises an average toggle rate of less than a threshold rate. In some examples, the threshold rate may comprise a toggle rate of less than one third of the operating frequency of the at least part of the IC design. In some examples, the threshold rate may comprise a toggle rate of less than one quarter of the operating frequency of the at least part of the IC design. In some examples, the threshold rate may comprise a toggle rate of less than one fifth of the operating frequency of the at least part of the IC design.

In some further examples, the at least one further, increased N/PBTI compensation margin may comprise a margin equal to 50% of the first N/PBTI compensation margin. For example, the first N/PBTI compensation margin may comprises a margin of between 8% and 10%, and the at least one further N/PBTI compensation margin comprises a margin of between 4% and 5%.

According to a further aspect of the invention there is provided a method and apparatus for performing static timing analysis of at least a part of an integrated circuit design, the method comprising calculating delay timing values for at least a part of the integrated circuit design in accordance with the method described above.

Referring first to FIG. 1, there is illustrated a simplified example of a part of an IC design 100 that may be implemented within an IC device 105. In the illustrated example, the part of the IC design comprises two signal path components, a data path component 110 and a control path component 120. Typically, the data path component 110 will have a switching rate substantially equal to, or at least in the region of, the operating frequency of the IC device 105 (e.g. as defined by a clock frequency). In contrast, the control path component 120 is likely to have a significantly reduced switching rate, for example in the region of a third of the IC device operating frequency or less.

The inventors have identified that there is a significant level of performance recovery when N/PBTI stress is removed, and that the amount a MOSFET (Metal Oxide Semiconductor Field Effect Transistor) device recovers depends on the length of time the device is subjected to N/PBTI stress: the longer the stress is applied, the less the recovery. Furthermore, the degradation has been found to be non-saturating, i.e., the level of non-recovering degradation increases as the period of time over which the stress is continually applied increases. The inventors have further identified that rare and often switching MOSFET devices exhibit different amounts of performance degradation; rarely switching devices exhibiting a significantly greater level of performance degradation compared to often switching devices. Accordingly, the inventors have recognized that applying the same N/PBTI compensation margins to delay values for all elements within an IC design during, for example, a static timing analysis process presents an unnecessary overhead for those higher-rate switching elements that suffer less from performance degradation. Accordingly, in some examples of the present invention it is proposed to apply a lower N/PBTI compensation margin to delay values for higher-rate switching elements within an IC design, such as elements within the logic blocks 112, 114 of the data path component 110 illustrated in FIG. 1, whilst applying a higher N/PBTI compensation margin to delay values for lower-rate switching elements within an IC design, such as elements within the logic block 122 of the control path component 120 illustrated in FIG. 1.

Figure 2:
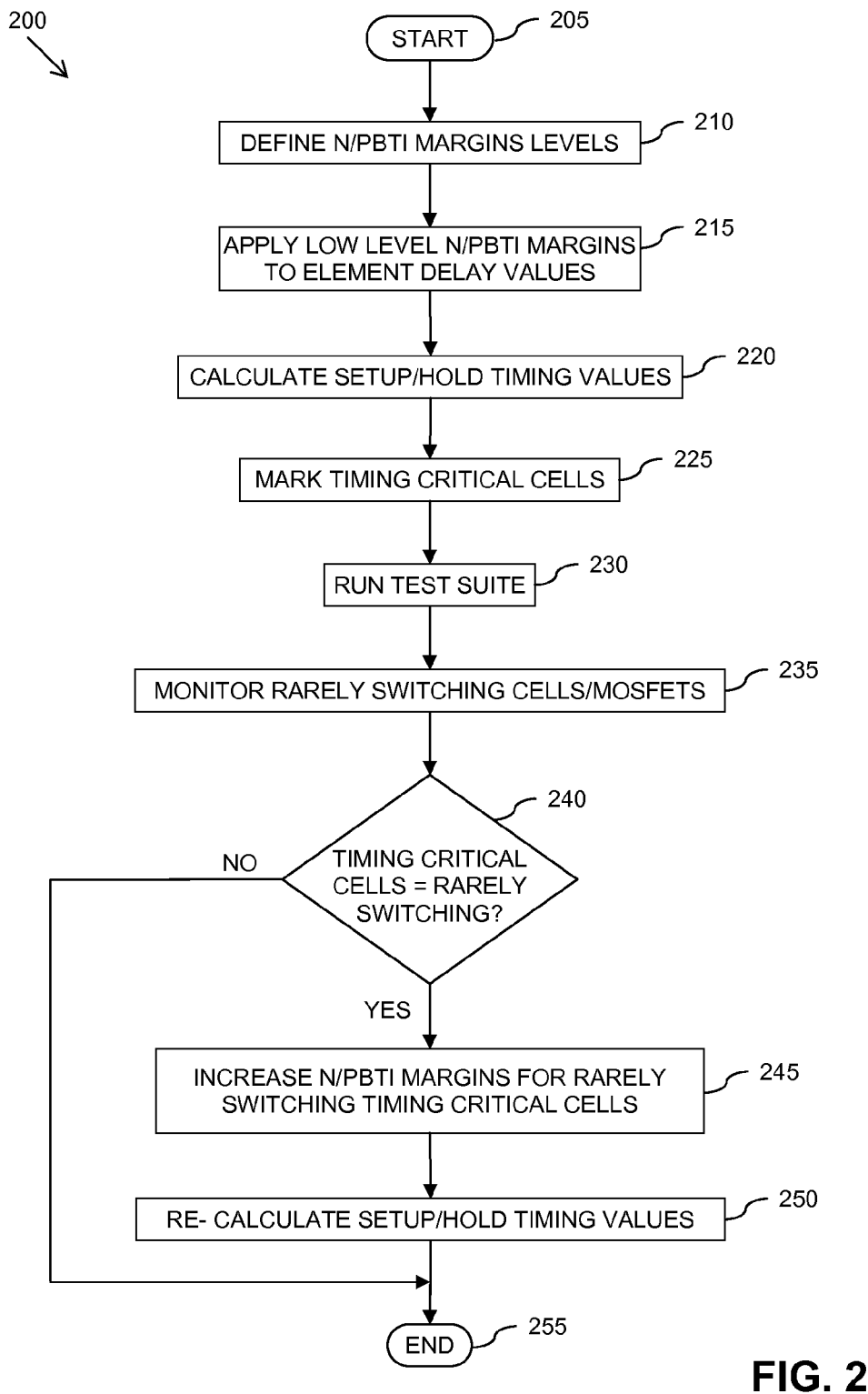
FIG. 2 illustrates a simplified flowchart of an example of a method of calculating delay timing values for at least a part of an integrated circuit design.

FIG. 2 illustrates a simplified flowchart 200 of an example of a method for calculating delay timing values for at least a part of an IC design. The method starts at 205, and moves on to 210 where N/PBTI compensation margin levels are defined. For example, a first (lower) default N/PBTI compensation margin may be defined, and one or more increased N/PBTI compensation margins may be defined. In some examples, the first N/PBTI compensation margin may comprise a margin equal to, say, approximately 50% of the (or a) further, increased N/PBTI compensation margin. Thus, in some examples the first N/PBTI compensation margin may be defined as comprising a margin equal to, say, 4% to 5%, and an increased N/PBTI compensation margin may be defined as, say 8% to 10%.

Next, at 215, the first, low level (default) N/PBTI is applied to, in the illustrated example, delay values for elements throughout the IC design. Setup and/or hold timing values may then be calculated for timing paths within the IC design based (at least partly) on delay values to which the first N/PBTI compensation margin has been applied, at 220. For example, such setup and/or timing values may be calculated by way of a static timing analysis of the IC design. Timing critical elements (e.g. cells) within the IC design may then be identified and marked based (at least partly) on the calculated setup/hold timing values, at 225. For example, timing critical elements may be identified as comprising elements within, say, identified critical timing paths of the IC design, where a critical timing path is identified as comprising the path with the maximum aggregated delay within a particular module of the IC design, and/or a path comprising an aggregated delay greater than a predefined delay threshold value. For clarity, the term 'element' used herein is intended to encompass, by way of example, a combination logic gate or cell comprising one or more combination logic gates, a register element such as a flip-flop, or any other type of element/component within the IC design, and in particular may comprise any element, device or component within the IC design comprising one or more MOSFET devices, and to which delay values are assigned and may be used to calculate setup and/or timing values during, for example, static timing analysis.

In the illustrated example, having identified and marked the timing critical elements, the method moves on to 230 where a test suite is applied to the IC design, and the switching activity of elements (cells) and/or MOSFET devices within the IC design is monitored at 235 to identify lower-rate switching elements/MOSFETs. In some examples, all elements/MOSFETs within the IC design may be monitored to identify lower-rate switching elements/MOSFETs based (at least partly) on the switching activity therefore. Conversely, in some alternative examples the switching activity of only a subset of elements/MOSFETs comprising at least the identified timing critical elements may be monitored. In some examples, an element may be identified as comprising a lower-rate switching element if said element comprises an average toggle rate of less than a threshold rate. In some examples, the threshold rate may comprise a toggle rate of less than one third of the operating frequency of the at least part of the IC design. In some examples, the threshold rate may comprise a toggle rate of less than one quarter of the operating frequency of the at least part of the IC design. In some examples, the threshold rate may comprise a toggle rate of less than one fifth of the operating frequency of the at least part of the IC design.

In the illustrated example, it is then determined at 240 whether any of the timing critical elements identified at 225 comprise lower-rate (rarely) switching elements, as identified at 235. If no lower-rate switching timing critical elements have been identified, the method may simply end at 255. Conversely, if it is determined that one or more timing critical elements comprise lower-rate switching elements, the method moves on to 245, where the increased N/PBTI compensation margin is applied to delay values for the identified lower-rate switching timing critical elements. Setup and/or hold timing values may then be re-calculated at least for timing paths within the IC design comprising the lower-rate switching timing critical elements for which the increased N/PBTI compensation margin has been applied to delay values. The method then ends, at 255.

Thus, a method of calculating delay timing values for at least a part of an IC design is provided in which lower-rate switching elements are identified, enabling different levels of N/PBTI compensation margins to be applied across the IC design, and in particular enabling reduced margins to be applied across the majority of elements within the IC design, whilst enabling increased N/PBTI compensation margins to be applied to the lower-rate switching elements. Advantageously, by identifying lower-rate switching elements, which are most susceptible to degradation of performance through N/PBTI stress, increased margins may be applied to the delay values for such vulnerable elements within the IC design, thereby helping to ensure field failures of the IC design are minimised, whilst enabling a reduced N/PBTI compensation margin to be applied to delay values for other elements within the IC design, thereby helping to avoid extra costs in terms of additional area, power and design effort across those parts of the IC device that do not suffer from significant NBTI/PBTI stress, and thus which do not require such generous additional margins.

Furthermore, in the illustrated example, lower-rate switching timing critical elements are identified, enabling increased N/PBTI compensation margins to be applied to the lower-rate switching timing critical elements. Advantageously, by identifying lower-rate switching timing critical elements, which are amongst the most susceptible elements to degradation of performance through N/PBTI stress and the most sensitive to setup/hold timing delays, increased margins may be applied to the delay values for such vulnerable and sensitive elements within the IC design, thereby further helping to avoid extra costs in terms of additional area, power and design effort across those parts of the IC device that do not suffer from significant NBTI/PBTI stress, and thus which do not require such generous additional margins.

Figure 3:
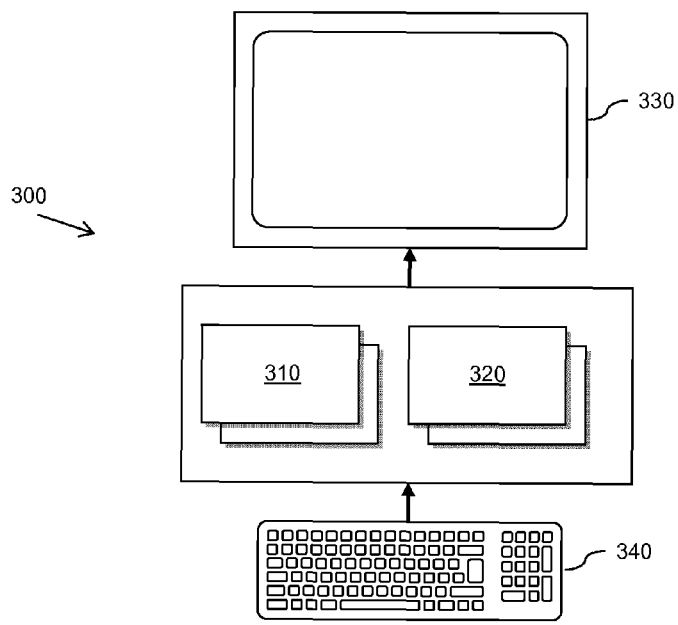
FIG. 3 illustrates a simplified block diagram of an example of an apparatus arranged to perform a method of calculating delay timing values for at least a part of an integrated circuit design.

Referring now to FIG. 3, there is illustrated a simplified block diagram of an example of an apparatus 300 arranged to perform a method of calculating setup timing values for setup timing stages within integrated circuit designs, such as one of the methods illustrated in FIG. 2 and/or FIG. 3 and described above. In the illustrated example, the apparatus comprises one or more signal processing modules 310 operably coupled to one or more memory elements 320. The apparatus may further comprise one or more user interface components, such as a display 330 and keyboard 340. The signal processing module(s) may be arranged to execute computer program code stored within the memory element(s) 320. The memory element(s) 320 may comprise any form of non-transitory computer program product, such as a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

In some examples, the signal processing module(s) 310 is/are arranged to execute computer program code operable for applying a first Negative/Positive Bias Temperature Instability (N/PBTI) compensation margin to delay values for elements within the at least part of the IC design, identifying at least one lower-rate switching element within the at least part of the IC design, and applying at least one further, increased N/PBTI compensation margin to the delay value(s) for the at least one identified lower-rate switching element.

Thus, the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources.

An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of calculating delay timing values for an integrated circuit, IC, design, the method comprising:
    applying, by a processing device, a first Negative/Positive Bias Temperature Instability, N/PBTI, compensation margin to delay values for elements within the IC design, wherein the N/PBTI compensation margin is an increase in the delay values;
    calculating setup/hold timing values for timing paths within the IC design based at least partly on delay values to which the first N/PBTI compensation margin has been applied;
    identifying, by the processing device, a lower-rate switching element within the IC design, wherein the lower-rate switching element has a lower switching rate than a switching rate of other switching elements in the IC design;
    identifying, by the processing device, that the lower-rate switching element is a timing critical element within the IC design;
    identifying timing critical elements based at least partly on the calculated setup/hold timing values; and
    applying, by the processing device, an increased N/PBTI compensation margin to a delay value for the identified timing critical elements and the identified lower-rate switching element in response to the lower-rate switching element being a timing critical element, wherein the IC design is provided for manufacturing of an IC device.

2. The method of claim 1, wherein the method comprises:
    applying a test suite to the IC design;
    monitoring switching activity of an element of the IC design during running of the test suite; and
    identifying the lower-rate switching element based on the switching activity of the element of the IC design.

3. The method of claim 2, wherein the method comprises:
    identifying the lower-rate switching element if an element comprises an average toggle rate of less than a threshold rate.

4. The method of claim 3, wherein the threshold rate comprises a toggle rate of less than one third of an operating frequency of the IC design.

5. The method of claim 4, wherein the threshold rate comprises a toggle rate of less than one quarter of the operating frequency of the IC design.

6. The method of claim 5, wherein the threshold rate comprises a toggle rate of less than one fifth of the operating frequency of the IC design.

7. The method of claim 1, wherein the first N/PBTI compensation margin comprises a margin equal to 50% of the increased N/PBTI compensation margin.

8. The method of claim 7, wherein the first N/PBTI compensation margin comprises a margin of between 8% and 10%, and the increased N/PBTI compensation margin comprises a margin of between 4% and 5%.

9. An apparatus comprising a processing device arranged to calculate delay timing values for an integrated circuit, IC, design, the processing device being arranged to:
    apply a first Negative/Positive Bias Temperature Instability, N/PBTI, compensation margin to delay values for elements within the IC design, wherein the N/PBTI compensation margin is an increase in the delay values;
    calculating setup/hold timing values for timing paths within the IC design based at least partly on delay values to which the first N/PBTI compensation margin has been applied;
    identify a lower-rate switching element within the IC design;
    identify that the lower-rate switching element is a timing critical element within the IC design;
    identifying timing critical elements based at least partly on the calculated setup/hold timing values; and
    apply an increased N/PBTI compensation margin to a delay value for the identified timing critical elements and the identified lower-rate switching element in response to the lower-rate switching element being a timing critical element, wherein the IC design is provided for manufacturing of an IC device.

10. The apparatus of claim 9, wherein the processing device further to identify the lower-rate switching element if an element comprises an average toggle rate of less than a threshold rate.

11. The apparatus of claim 10, wherein the threshold rate comprises a toggle rate of less than one third of an operating frequency of the IC design.

12. The apparatus of claim 9, wherein the processing device further to apply a test suite to the IC design, to monitor switching activity of an element of the IC design during running of the test suite, and to identify the lower-rate switching element based on the switching activity of the element of the IC design.

13. A non-transitory computer program product having executable program code stored therein for calculating delay timing values for an integrated circuit, IC, design, the program code operable for:
- applying a first Negative/Positive Bias Temperature Instability, N/PBTI, compensation margin to delay values for elements within the IC design, wherein the N/PBTI compensation margin is an increase in the delay values;
- calculating setup/hold timing values for timing paths within the IC design based at least partly on delay values to which the first N/PBTI compensation margin has been applied;
- identifying a lower-rate switching element within the IC design;
- identifying that the lower-rate switching element is a timing critical element within the IC design;
- identifying timing critical elements based at least partly on the calculated setup/hold timing values; and
- applying an increased N/PBTI compensation margin to a delay value for the identified timing critical elements and the identified lower-rate switching element in response to the lower-rate switching element being a timing critical element, wherein the IC design is provided for manufacturing of an IC device.

14. The non-transitory computer program product of claim 13, wherein program code operable for:
- identifying the lower-rate switching element if an element comprises an average toggle rate of less than a threshold rate.

15. The non-transitory computer program product of claim 13, wherein the threshold rate comprises a toggle rate of less than one third of an operating frequency of the IC design.

16. The non-transitory computer program product of claim 13, wherein program code operable for:
- applying a test suite to the IC design;
- monitoring switching activity of an element of the IC design during running of the test suite; and
- identifying the lower-rate switching element based on the switching activity of the element of the IC design.

\* \* \* \* \*